UNITED STATES PATENT OFFICE.

ANGUS W. SHAW, OF SACCARAPPA, MAINE.

IMPROVEMENT IN HYDRAULIC CEMENT.

Specification forming part of Letters Patent No. 183,713, dated October 24, 1876; application filed October 26, 1875.

*To all whom it may concern:*

Be it known that I, ANGUS W. SHAW, of Saccarappa, in the county of Cumberland and State of Maine, have invented a new and useful Improvement in Hydraulic Cement, of which the following is the specification:

This invention contemplates the fabrication of hydraulic cement from clay, any natural rock, shells, or coprolite, that will produce a sufficient quantity of lime for the purpose, by the following process:

I take of any kind of natural rock, stone, shells, coprolites, or any other material that will produce lime in sufficient quantity, and having first determined by analysis the components and properties of the article to be used, I reduce the raw material by crushing or breaking to the required size, which may be about the size of pea-nuts. To the material thus prepared I add a quantity of clay, as required. The proportions of these ingredients, in a mixture of one hundred parts, will be from twenty to forty per cent., more or less, of clay, and the balance of the crushed material above described. As the properties of the substances used will vary very widely, the proportion of clay to the rest of the material cannot be fixed with absolute certainty for all cases, but must depend upon actual experiment and analysis in each particular case, and it may be necessary to change the proportions during the process of manufacture, so as to insure the proper ultimate combination, and that no one part is carried forward alone.

The ingredients, prepared and combined as above described, are mixed together in a mill or by hand, and enough water added, at a temperature of about 120° Fahrenheit, more or less, to saturate the mixture. This mixture is then comminuted with water under two large edge runners. A sufficient quantity of water at a temperature of 120°, more or less, is added during this process to hold the mixture in solution, and, after the grinding shall have been sufficiently completed, the mixture will be allowed to flow off over one or more sieves placed in a horizontal position, through which the surplus water will escape, and then the mixture will be deposited in tanks or reservoirs, where it will be allowed to settle, and where it will be deprived of the greater bulk of its water. It is then conveyed onto drying-plates and thoroughly dried, after which it will be burnt in kilns, and after that it will be ground, when it will be ready for use.

The advantages of the several steps in my process over the ordinary process of making cement is that, by crushing the material first, I can the more uniformly mix the particles together in the next step of grinding in water, and make a more perfectly commingled mass, which is very desirable in the art. Then, straining and drying are essential preparatory to burning, and are a necessity to a perfect cement, while grinding or calcining finishes the process.

Having thus described my invention, I desire to claim—

1. Hydraulic cement, made from clay and coprolite lime, substantially in the manner described.

2. The process, substantially as herein described, of making hydraulic cement from clay and rocky or coprolite lime.

ANGUS WM. SHAW.

Witnesses:
JOHN M. ALLEN,
JAMES L. FELLOWS.